Feb. 25, 1964  E. W. McCAULEY ETAL  3,122,639
RADIOACTIVE TORQUE SENSING DEVICE
Filed Dec. 23, 1959  2 Sheets-Sheet 1
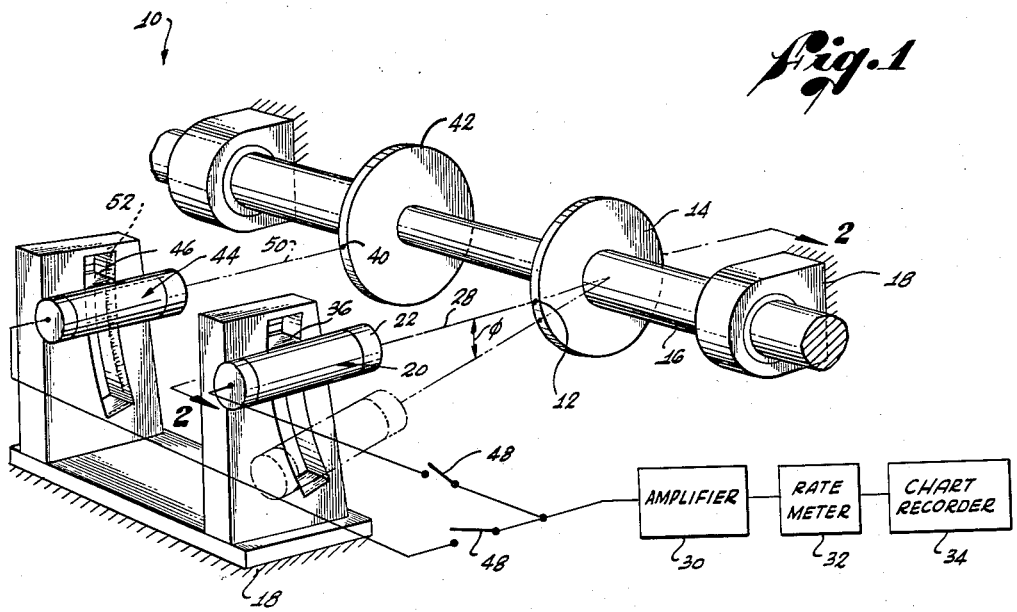
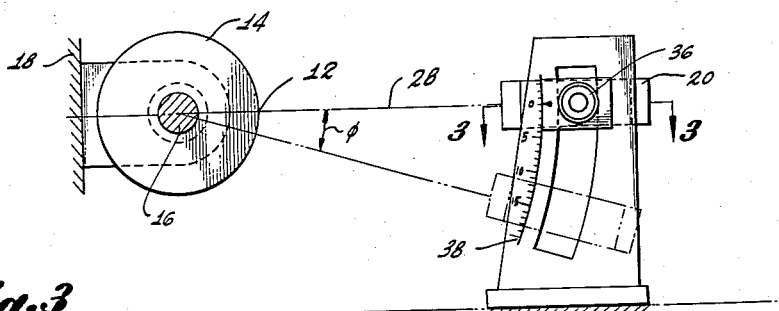
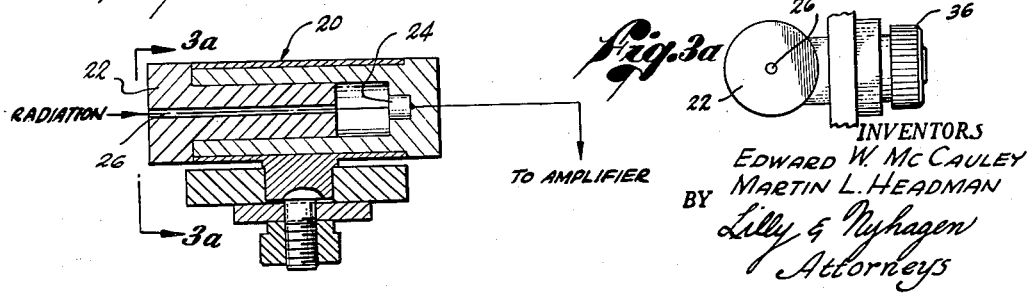
INVENTORS
EDWARD W. McCAULEY
MARTIN L. HEADMAN
BY Lilly & Nyhagen
Attorneys Feb. 25, 1964 E. W. McCAULEY ETAL 3,122,639
RADIOACTIVE TORQUE SENSING DEVICE
Filed Dec. 23, 1959 2 Sheets-Sheet 2
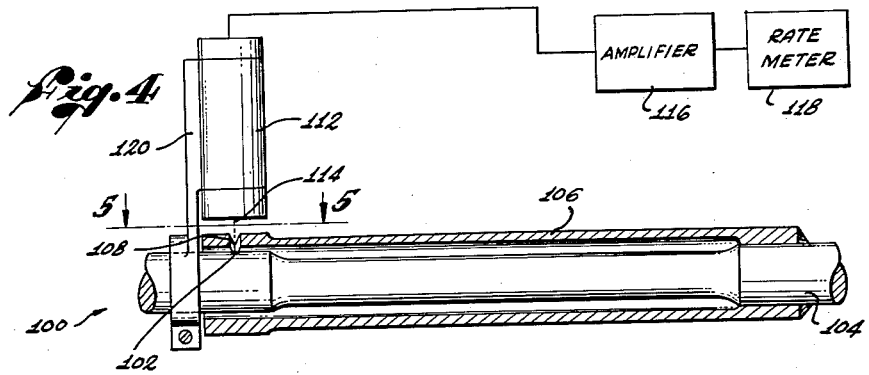
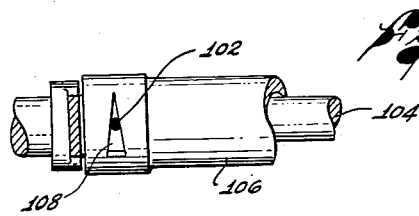
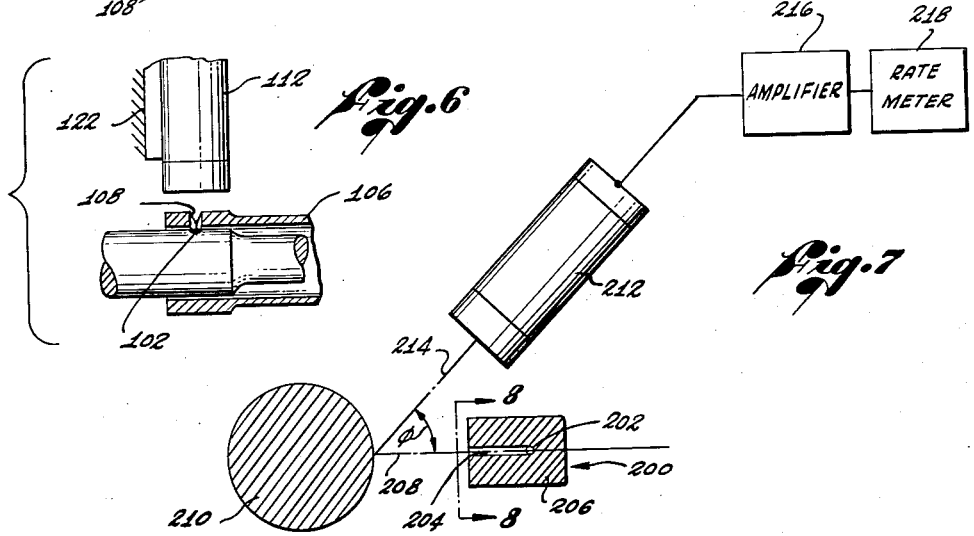
INVENTORS
EDWARD W. McCAULEY
BY MARTIN L. HEADMAN
Lilly & Nyhagen
Attorneys

United States Patent Office 3,122,639
Patented Feb. 25, 1964

3,122,639
RADIOACTIVE TORQUE SENSING DEVICE
Edward W. McCauley and Martin L. Headman, Fullerton, Calif., assignors to Western Gear Corporation, Lynwood, Calif., a corporation of Washington
Filed Dec. 23, 1959, Ser. No. 861,585
5 Claims. (Cl. 250—83.3)

This invention deals generally with torque sensing devices and has as its general object to provide a new and improved torque transducer.

A more specific object of the invention is to provide a torque transducer in which torsional strain in a torque transmission shaft produces certain proportional changes in energy radiations incident on a radiation detection means and in which the transmitted torque is sensed and measured by determining these changes in the incident radiations.

Another object of the invention is to provide a torque transducer of the character described which requires no direct connection between the torque transmission shaft and the torque sensing means so that the transducer imposes no additional torque load on the shaft.

Yet another object of the invention is to provide a torque transducer of the character described which permits accurate torque measurements in high speed, rotary torque transmission systems.

A further object of the invention is to provide a torque transducer of the character described which can be used in either static or dynamic torque transmission systems.

Yet a further object of the invention is to provide a radiant energy torque transducer of the character described which is ideally suited for use with a radioactive energy radiating means, such as a radioisotope.

A still further object of the invention is to provide a torque transducer which is capable of operation under extreme conditions of pressure, temperature, explosive atmosphere and the like.

Other objects of the invention are to provide a torque transducer which is simple in construction, economical to manufacture, easy to use and reliable in operation.

Briefly, these objects are attained by providing a torque transducer equipped with radiant energy means, radiant energy detection means for receiving radiant energy from the radiant energy means, means for sensing the radiant energy incident on the detection means, and a torque transmission shaft which undergoes a torsional strain proportional to the torque transmitted by the shaft and includes means for modulating the radiant energy incident on the detection means in proportion to the torsional strain in the shaft. Three illustrative embodiments of the invention are disclosed, each employing radioisotope means as the radiant energy means. It will become clear as the description proceeds, however, that at least two forms of the invention may use other types of radiant energy means.

In one illustrative embodiment of the invention, a source of radiant energy is angularly displaced in proportion to torsional strain in the torque transmission shaft and the torque load on the shaft is determined by sensing this angular displacement of the source. In the second illustrative form of the invention, the intensity of the radiant energy incident on the radiant energy detection means is attenuated in proportion to torsional strain in the shaft and this attenuation is sensed to determine the torque load on the shaft. In the third illustrative form of the invention, the radiant energy detection means receives radiant energy that is reflected or back scattered at a given angle from the surface of the torque transmission shaft. Torsional strain in the shaft produces changes in the amount of radiant energy received by the detection means which are proportional to the torsional strain and are sensed to determine the torque load.

A better understanding of the invention may be had from the following detailed description thereof taken in connection with the annexed drawings, wherein:

FIG. 1 is a semi-diagrammatic illustration, in perspective, of one form of this invention;
FIG. 2 is a section taken on line 2—2 of FIG. 1;
FIG. 3 is an enlarged section taken on line 3—3 of FIG. 2;
FIG. 3a is a section taken on line 3a—3a of FIG. 3;
FIG. 4 illustrates a second illustrative form of this invention;
FIG. 5 is a view looking in the direction of the arrows on line 5—5 of FIG. 4;
FIG. 6 is a partial view illustrating a minor change to the device of FIG. 4;
FIG. 7 illustrates a third form of the invention; and
FIG. 8 is a view looking in the direction of the arrows on line 8—8 of FIG. 7.

As preliminarily mentioned, the objects of the invention are attained by providing a torque transducer equipped with a torque transmission shaft, a radiant energy source, a radiant energy detection means to receive radiations from the source, and a means to produce a change in the radiations at the detection means which is proportional to torsional strain in the shaft. In the illustrative transducer 10 of FIGS. 1–3a, the radiant energy source comprises a small piece of radioactive material 12, such as a radioisotope, which is enclosed within, cemented or otherwise fixed to the outer edge of a disc 14. This disc is fixed on the torque transmission shaft 16 of the transducer.

Mounted on the supporting structure 18, which carries the shaft 16, is a radiation detection means 20. In FIG. 3, radiation detection means 20 will be observed to comprise a forward collimator means 22 and a rear radiation detector 24. Collimator 22 may consist, for example, of a lead cylinder having a small axial bore 26 through which radiations from the source 12 can pass to the detector 24. The axis 28 of the collimator is located in the plane of rotation of the source 12 and intersects the axis of the shaft 16. The radiation detector 24 may comprise any conventional radiation detector which generates an electrical output proportional to the rate of incidence of radiations on the detector. This output is fed to an amplifier 30 and then to a meter 32 and a recorder 34 for indicating the rate of incidence. The radiation detection means 20, amplifier 30 and rate meter 32 thus actually comprise a radiation counting means.

From this description, it is evident that the radiation detector 24 receives radiations from the radioactive source 12 and, therefore, the meter 32 and recorder 34 indicate a reading only when the radioactive source 12 is approximately or exactly aligned with sensitive axis 28 of the radiation detection means 20. The meter 32 and recorder 34, of course, will indicate a maximum reading when the source 12 is exactly aligned with the axis 28.

The radiation detection means 20 is attached to the supporting structure 18 by means of angularly adjustable mount 36. This mount is swingable to angularly adjust the detection means about the axis of the torque shaft, as indicated in phantom lines in FIGS. 1 and 2. The illustrated solid line position of the detection means will be hereinafter referred to as its normal or zero position.

Assume now that the shaft 16 comprises a stationary torque transmission shaft in a static torque transmission system. In this case, the parts of the transducer are arranged so that when the detection means 20 occupies its solid line zero position and the torque shaft is unloaded, the radioactive source 12 is exactly aligned with the sensitive axis of the detection means. Assume now that a counterclockwise torque is imposed on the shaft by twisting the right-hand end of the shaft in FIG. 1. The radioactive source is then rotated in a counterclockwise direction from its position of FIG. 1, wherein it is aligned with the sensitive axis of the detection means. The angle through which the radioactive source is rotated is, of course, proportional to the twist or torsional stran in the shaft and to the torque load imposed on the shaft. This angle is determined by swinging the radiation detection means 20 from its zero position to realign its sensitive axis 28 with the radioactive source. Realignment of the axis with the source may be determined from the rate meter 32 and occurs when the rate meter indicates a maximum reading. A scale 38 is provided for indicating the angle of rotation $\phi$ of the radiation detection means from its zero position. This angle, of course, is equal to the angle through which the radioactive source is rotated by the torque in the shaft and is, therefore, proportional to the torque.

The angle $\phi$ obtained from the instrument thus far described, of course, represents a total twist in the shaft 16 between the point at which its left-hand end is fixed and the transverse plane of the shaft passing through the radioactive source 12. In order to determine exact torque values, however, it is necessary to determine the twist or torsional strain in the shaft per unit length of the shaft. If the length of the shaft between the point at which its left-hand end is fixed and the transverse plane of the radioactive source 12 is known, the exact torque load in the shaft can be determined from the angle $\phi$. In the alternative, of course, the scale 38 could be suitably calibrated to indicate torque values directly.

To facilitate such quantitative torque determinations with the present transducer, the latter is equipped with a second radioactive source 40, fixed to the edge of a disc 42 on the torque shaft, and a second radiation detection means 44 identical in structure to the radiation detection means 20 already described. The disc 42 is located so as to provide a predetermined shaft length between the transverse planes of the shaft passing through the radioactive sources 12 and 40, respectively. The second radiation detection means 44 is attached to the supporting structure 18, for angular adjustment on the axis of the shaft, by means of an angularly adjustable mount 46, identical to the mount 36. Switches 48 are provided for selectively connecting the output of the radiation detection means 20 and 44 to the amplifier 30, either individually or in parallel. The second radioactive source 40 is arranged to be exactly aligned with source 12, lengthwise of the shaft 16, when the latter is unloaded.

Assume still that the shaft 16 comprises a stationary torque transmission shaft in a static torque transmission system and that a torque load is imposed on the shaft by twisting its right-hand end while its left-hand end is fixed. In this case, both of the radioactive sources 12 and 40 are rotated in the direction of the applied torque. The right-hand radioactive source 12, however, is rotated through an angle which is greater than the angle of rotation of the radioactive source 40 by an amount proportional to the torsional strain in the shaft and the torque load on the shaft. The exact magnitude of the torque load, of course, can be calculated from this angular displacement between the two radioactive sources and the length of the shaft between the sources. The relative angular displacement of the sources produced by torque load in the shaft is determined as follows.

Switches 48 are first set to connect the output of one of the radiation detection means, say means 44, to the amplifier 30. This detection means is then adjusted to align its sensitive axis 50 with the radioactive source 44. Switches 48 are then set to connect the output of the radiation detection means 20 to the amplifier and the latter detection means is angularly adjusted to align its axis 28 with the radioactive source 12. The reading on a scale 52, for indicating the angle of rotation of the detection means 44 from its zero position, is then subtracted from the reading on the scale 38, for the radiation detection means 20, to obtain the relative angular displacement of the radioactive sources resulting from the torque load in the shaft. The section of the torque shaft between the discs 14 and 42 may be reduced in diameter, as shown, to increase the sensitivity of the transducer.

The torque transducer of FIGS. 1–3$a$ can also be used in a dynamic torque transmission system in which case the shaft 16 comprises a rotary torque transmission shaft. In this use, the switches 48 are both closed to connect the output of both radiation detection means 20 and 44 to the amplifier 30.

It is obvious that when the shaft is driven, the radioactive sources 12 and 40 move across the sensitive axes 28 and 50 of their respective radiation detection means 20 and 44 and the later cause to be generated, from their respective radiation detection means, a series of electrical impulses once during each revolution of the shaft. The outputs of the radiation detection means are combined or added so that if the radioactive sources 12 and 40 move across their respective sensitive axes 28 and 50 simultaneously, the resultant reading on the meter 32 will be significantly greater than that resulting from successive or non-simultaneous movement of the radioactive sources across the axes.

Assume now that the radiation detection means 20 and 44 are set in their zero positions and the torque shaft 16 is unloaded. Under these conditions, the radioactive sources 12 and 40 move across their sensitive axes simultaneously so that the meter 32 indicates a maximum reading once during each shaft revolution. If a torque is imposed on the rotating shaft, the radioactive sources become relatively angularly displaced, as discussed earlier. Accordingly, the sources no longer move across the sensitive axes 28 and 50 simultaneously and the meter 32 indicates a new maximum reading which is less than the maximum reading indicated when the shaft is not under an applied torque load. The relative angular displacement of the radioactive sources produced by the torque loading on the shaft is determined by angularly adjusting one of the radiation detection means 20 or 44, say means 20, until the sources again move across the sensitive axes simultaneously. This, of course, is indicated by a maximum reading on the meter 32. The angle $\phi$ through which the detection means must be relatively displaced to accomplish this is obviously related to the torsional strain in the shaft and hence to the torque loading on the shaft. Again, the actual magnitude of the torque load may be determined from this angular displacement and the axial spacing between the radioactive sources.

Reference is now made to FIGS. 4–6 illustrating a modified version of the present torque transducer. In this modified torque transducer 100, the radiant energy source again comprises a small piece 102 of radioactive material, such as a radioisotope, which is fixed in some suitable way to the troque transmission shaft 104 of the transducer. This shaft undergoes a torsional strain proportional to the torque load on the shaft, as in the previous form of the invention.

Fixed at one end to the shaft 104, at a predetermined distance from the radioactive source 102, is a radiation attenuating sleeve 106. The other end of this sleeve extends over the radioactive source, as shown. The sleeve is made of suitable shielding material, such as lead, which is relatively impervious to the radiations emitted from the source 102.

Sleeve 106 has an attenuator section 108, shown as a tapered slot, aligned with the radioactive source, as may be best observed in FIG. 5. Other attenuator sections may be used, of course. It is evident from the drawings that when a torsional strain is produced in the shaft, the tapered slot 108 is rotated, on the axis of the shaft, with respect to the radioactive source 102 and through an angle which is proportional to the torsional strain, and hence to the torque load, in the shaft.

Indicated at 112 is a radiation detection means identical to those previously described. The sensitive axis 114 of this detection means is located in the plane of the radioactive source 102 and intersects the axis of the shaft 104. The output of the detection means 112 is connected through an amplifier 116 to a meter 118 for indicating the rate of incidence of radiations from the source 102 on the radiation detection means 112.

In a static torque transmission system, the radiation sensing means 112 is rigidly attached to the shaft 104, by means of a bracket 120, for example, immediately adjacent to the radioactive source 102, with its sensitive axis 114 aligned with the source. The sleeve 106 is fixed to the shaft so that under a no-load condition, the radioactive source is located at the mid point of the tapered slot 108, as shown in FIG. 5. The radiations incident on the radiation detection means 112 along its sensitive axis now produce a given reading on the meter 118. When a torque is produce in the shaft, the tapered slot 108 is rotated in one direction or the other, depending on the direction of the applied torque, with respect to the radioactive source. This obviously has the effect of producing a proportional change in the intensity or rate of incidence of the radiations incident on the radiation detection means 112 along its sensitive axis and, hence, in the reading of the meter 118. A torque in one direction increases the reading while a torque in the opposite direction decreases the reading. It is evident that the meter 118 can be calibrated to indicate torque values directly.

The reason for attaching the radiation sensing means 112 to the shaft 104, close to the radioactive source 102, is obviously to maintain the sensitive axis of the sensing means and the source in alignment during torsional twisting of the shaft. In a dynamic torque transmission system, wherein the shaft 104 rotates, this requirement is eliminated and the radiation sensing means 112 can be mounted on the supporting structure 122 for the shaft, as shown in FIG. 6. In this case, the radioactive source moves across the sensitive axis 114 of the radiation detection means once during each revolution of the shaft. The rate of incidence of the radiations on the detection means along its sensitive axis during each of these passages of the source past the detection means is dependent on the position of the tapered slot with respect to the source and, hence, on the torsional strain and torque load in the shaft. Clearly, therefore, the torque load in the shaft may be sensed or determined from the reading on the meter 118, as before.

Reference is now made to the third form of the invention illustrated in FIGS. 7 and 8. Here, again, the radiant energy source 200 is shown as comprising a small piece 202 of radioactive material which is positioned in the bottom of a small bore 204 extending into one end face of a cylindrical shield 206. This shield is made of a material, such as lead, which is relatively impervious to the radiations emitted by the radioactive material 202. The axis 208 of this bore intersects the axis of the torque transmission shaft 210 of the transducer. The bore has a substantial depth so that the shield acts to collimate the radiations from source 202 into a beam of radiant energy or radiant beam which is directed along the axis 208 against the outer surface of the torque shaft 210.

When the beam of radiation impinges the surface of the shaft, some of the radioactive particles are reflected or back scattered in various directions. In the transducer of FIGS. 7 and 8, a radiation detection means 212, identical to those previously described, is arranged with its sensitive axis 214 intersecting the axis 208 of the radiation source 200 at the surface of the shaft 210 and at a predetermined angle $\phi$ so as to receive radiations which are reflected or back scattered from the surface of the shaft at the angle $\phi$. The output of the radiation detection means is connected through an amplifier 216 to a meter 218 for indicating the rate of incidence of radiations on the radiation detection means along its sensitive axis, as in the previous forms of the invention.

Under no-load conditions, a certain percentage of the radiations incident on the surface of the shaft are back scattered at the angle $\phi$ so as to be incident on the detection means 212 along its sensitive axis and the meter 218 indicates a corresponding reading. When a torque load is imposed on the shaft, the material of the shaft undergoes a crystalline lattice structure distortion as well as a diameter reduction and certain other physical changes which result in a change in the amount of radiation back scattered at the angle $\phi$ and, hence, a change in the radiation incident on the detection means along its sensitive axis. The actual change in the amount of radiation back scattered at the angle $\phi$ has been found to be proportional to the torsional strain in the shaft and, hence, to the torque load on the shaft. Thus, by properly calibrating the transducer, the torque load on the shaft may be directly obtained from the meter 218. It is obvious that this modified torque transducer of FIGS. 7 and 8 is capable of use in either static or dynamic torque transmission systems.

Certain additional modifications of the invention will become immediately apparent to those skilled in the art. A few of these additional modifications will be cited by way of example. While in the illustrative embodiments of the invention, the radiant energy source comprises a radioactive material, such as a radioisotope, it is quite possible, especially in the forms of the invention illustrated in FIGS. 1–6, that other types of radiant energy sources may be employed. Also, in the first two forms of the invention, it is conceivable that the positions of the radiant energy sources and the radiation detection means might be reversed; that is to say, the radiation detection means might be carried on the torque transmission shaft and the radioactive sources mounted on the supporting structure. In the alternative, both the radiant energy sources and the radiation detection means might be carried on the shaft in which case the transducers would become, in effect, static systems.

Various other modifications in design, arrangement of parts and instrumentalities of the invention are possible within the scope of the following claims.

What is claimed is:

1. A torque transducer, comprising:
   a support,
   a rotary torque shaft on said support which undergoes a torsional strain proportional to the torsional stress in the shaft,
   a pair of radioactive elements mounted on said shaft at positions spaced therealong,
   said elements emitting given nuclear radiation,
   a pair of collimator units mounted on said support and each including a part which is relatively opaque to said radiation and has a small radiation permeable passage facing the shaft at one end and a radiation detector sensitive to said radiation and located opposite the other end of the passage in the respective collimator,
   one of said passages being disposed on an axis approximately intersecting the rotation axis of said shaft and the circular path of movement of one of said elements with said shaft and the other passage being disposed on an axis approximately intersecting the rotation axis of the shaft and the circular path of movement of the other element with the shaft,
   means for angularly positioning one unit about the axis of said shaft, and
   an electrical pulse counting circuit connected to said detectors.

2. A torque transducer, comprising:
   a support,
   a rotary torque shaft on said support which undergoes a torsional strain proportional to the torsional stress in the shaft, a pair of radioactive elements mounted on said shaft at positions spaced therealong, said elements emitting given nuclear radiation, a pair of collimator units mounted on said support and each including a part which is relatively opaque to said radiation and has a small radiation permeable passage facing the shaft at one end and a radiation detector sensitive to said radiation and located opposite the other end of the passage in the respective collimator, one of said passages being disposed on an axis approximately intersecting the rotation axis of said shaft and the circular path of movement of one of said elements with said shaft and the other passage being disposed on an axis approximately intersecting the rotation axis of the shaft and the circular path of movement of the other element with the shaft.

means for independently angularly positioning said units about the axis of said shaft, and an electrical pulse counting circuit connected to said detectors.

3. A torque transducer, comprising:

a supporting member, a rotary torque shaft member on said supporting member which undergoes a torsional strain proportional to the torsional stress in the shaft member, a first radiation emitting element which emits given radiation, a first electrical radiation sensing element which is sensitive to said given radiation, a first radiation collimator including a body which is opaque to said given radiation and a radiation permeable passage extending through said body on a given axis of the body, means mounting one of said elements on one of said members, whereby during rotation of said shaft member, said one element and the other member undergo relative rotation in such manner that the apparent relative motion of said one element with respect to said other member is along a first circular path centered on the axis of rotation of said shaft member, means mounting the other element on said collimator at one end of said radiation permeable passage in such manner that said collimator and said other element form an integral unit, means mounting said unit on said other member in a position wherein said collimator axis intersects said path and the other end of said passage faces said path, whereby during rotation of said shaft member, said one element and said unit undergo relative rotation through a position wherein said elements are aligned on said collimator axis and said sensing element receives radiation from said radiation emitting element along said collimator axis, means for effecting relative angular adjustment of said one element and said unit about said shaft member independently of the relative angular motion between said one element and said unit which occurs as the result of rotation of said shaft member and in such manner as to shift the point of intersection of said collimator axis and said path along the latter, a second radiation emitting element which emits said given radiation, a second electrical radiation sensing element which is sensitive to said given radiation, a second radiation collimator including a body which is opaque to said given radiation and a radiation permeable passage extending through said latter body on a given axis of the latter body, means mounting one of said second elements on one of said members, whereby during rotation of said shaft member said one second element and the other member undergo relative rotation in such manner that the apparent relative motion of said latter element with respect to said latter member is along a second circular path centered on said rotation axis, means mounting the other second element on said second collimator at one end of the radiation permeable passage in the latter collimator in such manner that said latter element and said second collimator form a second integral unit, means mounting said second unit on said last-mentioned other member in a position wherein said axis of said second collimator intersects said second path and the other end of said passage in the latter collimator faces said second path, whereby during rotation of said shaft member, said one second element and said second unit undergo relative rotation through a position wherein said second elements are aligned on the axis of said second collimator and said second sensing element receives radiation from said second radiation emitting element along the latter axis, that first element and that second element which are mounted on said shaft member being spaced along the latter member, whereby a change in the torsional strain in the shaft member produces relative rotation of the latter elements about said rotation axis, and an electrical circuit coupled to said radiation sensing elements for generating an electrical output related to the radiation incident on said sensing elements.

4. The subject matter of claim 3, wherein:

said radiation emitting elements comprise radioactive sources, said radiation sensing elements comprise nuclear radiation detectors sensitive to the nuclear radiation emitted by said sources, and said electrical circuit comprises an electrical pulse counting circuit.

5. The subject matter of claim 3, wherein:

said one first element comprises said first radiation emitting element and said one second element comprises said second radiation emitting element, said other first element comprises said first radiation sensing element and said other second element comprises said second radiation sensing element, and said units are mounted on said supporting member.

References Cited in the file of this patent

UNITED STATES PATENTS

| | | |
|---|---|---|
| 2,136,223 | Thomas | Nov. 8, 1938 |
| 2,176,935 | Smith | Oct. 24, 1939 |
| 2,313,923 | Chubb | Mar. 16, 1943 |
| 2,501,560 | Blau | Mar. 21, 1950 |
| 2,629,256 | Rank | Feb. 24, 1953 |
| 2,683,813 | Friedman | July 13, 1954 |
| 2,692,951 | Voelker | Oct. 26, 1954 |
| 2,768,525 | Brownhill et al. | Oct. 30, 1956 |

FOREIGN PATENTS

| | | |
|---|---|---|
| 6,913 | Great Britain | Mar. 20, 1912 |

OTHER REFERENCES

KAPL–M–GLC–3, 1957; The Library of Congress, Publications Board, Photo Duplication Service, Washington, D.C.